United States Patent
Hendriks et al.

(10) Patent No.: US 8,415,417 B2
(45) Date of Patent: *Apr. 9, 2013

(54) NON-FIBROUS POLYMER SOLUTION OF PARA-ARAMID WITH HIGH RELATIVE VISCOSITY

(75) Inventors: Anton J. J. Hendriks, Lent (NL); Jan M. Surquin, Arnhem (NL); Mirjam E. Oldenzeel, Westervoort (NL); Rene Journee, Duiven (NL); Vincent A. Van Bommel, Zevenaar (NL)

(73) Assignee: Teijin Aramid B.V., Arnhem (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/790,236

(22) Filed: May 28, 2010

(65) Prior Publication Data

US 2010/0234496 A1    Sep. 16, 2010

Related U.S. Application Data

(62) Division of application No. 10/556,152, filed as application No. PCT/EP2004/004695 on May 4, 2004, now Pat. No. 7,754,797.

(30) Foreign Application Priority Data

May 8, 2003  (EP) ..................................... 03010367

(51) Int. Cl.
  *C08K 3/00* (2006.01)
  *C08G 73/10* (2006.01)
  *C08G 9/26* (2006.01)

(52) U.S. Cl.
  USPC ........... 524/233; 524/401; 524/600; 528/310; 528/335

(58) Field of Classification Search .................. 524/401, 524/24, 40, 430, 600, 606, 241, 233; 260/30.2, 260/30.6; 528/310, 322, 331, 335, 347, 248; 442/415–41, 327, 415–441; 508/258

See application file for complete search history.

(56) References Cited

U.S. PATENT DOCUMENTS

| | | |
|---|---|---|
| 3,063,966 A | 11/1962 | Stephanie et al. |
| 3,673,143 A | 6/1972 | Bair et al. |
| 4,511,623 A | 4/1985 | Yoon et al. |
| 4,579,895 A | 4/1986 | Cuidard et al. |
| 4,921,900 A | 5/1990 | Van Trump |
| 4,959,453 A | 9/1990 | Sweeny |
| 5,021,123 A | 6/1991 | Sweeny |
| 5,028,372 A | 7/1991 | Brierre et al. |
| 5,106,560 A | 4/1992 | Duffy et al. |
| 5,202,184 A | 4/1993 | Brierre et al. |
| 5,416,164 A | 5/1995 | Lee |
| 5,442,003 A * | 8/1995 | Takahashi et al. ............ 524/104 |
| 5,523,034 A | 6/1996 | Lee |
| 5,728,799 A * | 3/1998 | Oh ................................ 528/310 |
| 6,569,987 B1 | 5/2003 | Ohba et al. |
| 7,754,797 B2 * | 7/2010 | Hendriks et al. ............. 524/401 |
| 2010/0056731 A1 * | 3/2010 | Hendriks et al. ............. 525/420 |

FOREIGN PATENT DOCUMENTS

| | | |
|---|---|---|
| EP | 0 104 410 | 4/1984 |
| EP | 572002 | 12/1993 |
| EP | 1 143 048 A | 10/2001 |
| GB | 1 283 064 A | 2/1969 |
| JP | 50-8474 B | 4/1975 |
| JP | 52-124050 A | 10/1977 |
| JP | 57-164151 A | 10/1982 |
| JP | 02-202522 A | 8/1990 |
| JP | 04-245908 A | 9/1992 |
| JP | 6-041298 A | 2/1994 |
| WO | WO 92/14774 | 9/1992 |
| WO | WO 94/24211 A | 10/1994 |
| WO | WO 97/03109 A | 1/1997 |

* cited by examiner

Primary Examiner — Vasu Jagannathan
Assistant Examiner — Hannah Pak
(74) Attorney, Agent, or Firm — Oliff & Berridge, PLC

(57) ABSTRACT

The invention relates to a non-fibrous polymer solution essentially consisting of 1 to 8 wt. % para-aramid, at least 50 mole % of the aromatic moieties thereof being unsubstituted, in a mixture of a) a polar amide solvent selected from N-methyl-2-pyrrolidone, N,N'-dimethylformamide, N,N'-dimethylacetamide, tetramethylurea, and mixtures thereof; b) between 0.7 mole of an alkali or earth alkali chloride per mole amide groups of the para-aramid and 7.5 wt. % of the alkali or earth alkali chloride, and c) water; and wherein at least 50 wt. % of the formed hydrochloric acid has been neutralized to obtain a solution having a dynamic viscosity which is at least a factor three smaller than the dynamic viscosity of the polymer solution without neutralization. The invention further pertains to a process making the same and para-aramid pulp-like fiber, paper and film made from said polymer solution.

8 Claims, No Drawings

NON-FIBROUS POLYMER SOLUTION OF PARA-ARAMID WITH HIGH RELATIVE VISCOSITY

CROSS REFERENCE TO RELATED APPLICATIONS

This is a Continuation of application Ser. No. 10/556,152 filed Dec. 29, 2005, which is a National Stage application of PCT/EP2004/004695 filed on May 4, 2004, which claims the benefit of European Patent Application No. 03010367.5, filed May 8, 2003. The disclosure of the prior applications is hereby incorporated by reference herein in their entirety.

BACKGROUND

The present invention pertains to a non-fibrous polymer solution of para-aramid in a mixture of a polar amide solvent selected from N-methyl-2-pyrrolidone, N,N'-dimethylformamide, N,N'-dimethylacetamide, tetramethylurea, and mixtures thereof, water, and an alkali or alkaline earth metal chloride, such as calcium chloride ($CaCl_2$) or lithium chloride (LiCl). The invention further relates to (1) a method of preparing said solution, (2) a method of spinning the polymer solution, (3) a para-aramid pulp, (4) para-aramid paper and (5) para-aramid film made of said solution.

Para-oriented aromatic polyamides which are condensation polymers of a para-oriented aromatic diamine monomer and a para-oriented aromatic dicarboxylic acid halide monomer (hereinafter abbreviated to "para-aramids") have hitherto been known to be useful in various fields such as fiber, pulp and the like, because of their high strength, high elastic modulus and high heat resistance. Poly(para-phenylene terephthalamide) (hereinafter abbreviated to "PPTA") is one example of a para-aramid.

Hitherto, PPTA has been produced in polar amide solvent/hexamethylphosphoramide (HMPA) or in polar amide solvent/salt systems. Thus, PPTA is produced by carrying out a solution polymerization reaction in a polar amide solvent. The PPTA is precipitated, neutralized, washed with water and dried, and once isolated as a polymer. Then, the polymer is dissolved in a solvent and can be made into a PPTA fiber by the process of wet spinning. In this step, concentrated sulfuric acid is used as the solvent for spinning dope, because PPTA is not readily soluble in organic solvents. This spinning dope usually shows an optical anisotropy.

Industrially, PPTA fiber is produced from a spinning dope using concentrated sulfuric acid as a solvent, considering the performances as a long fiber, particularly strength and stiffness.

According to the prior process, a pulp is produced by mechanically cutting a PPTA fiber, dispersing the cut fiber in water and fibrillating the dispersed fiber by a mechanical shearing means such as beating or the like, followed by filtration and drying. In such prior process, the steps of polymerization, spinning, and pulp making are completely independent of one another. That is, the step of polymerization uses a polar amide solvent, the step of spinning uses concentrated sulfuric acid as solvent, and the step of pulp making uses water as a dispersing medium. This is economically disadvantageous as an industrial process.

Therefore, it has been attempted to spin the polymer directly into pulp. In U.S. Pat. No. 4,959,453 and U.S. Pat. No. 5,021,123, a fiber-containing non-pourable gel was prepared. After gelation, the product must be isolated by further dispersing the composition by dilution in a vigorously stirred precipitating medium comprising a non-solvent for the polymer. Spinning of this fibrous gel is very difficult and fiber properties cannot be controlled. Further, it has been disclosed that extrusion must be done under pressure and at high temperature (i.e., 90° C.). Furthermore, it is required to use N-methyl-pyrrolidine in order to obtain pulp-like fibers, as was disclosed in Example A of U.S. Pat. No. 5,021,123.

In U.S. Pat. No. 3,673,143, particularly in Examples 8 and 9, para-aramid solutions were prepared. In Example 9, a chloro-substituted para-aramid was dissolved in N,N-dimethylacetamide (DMAc) without the addition of an alkali or alkaline earth metal chloride. The latter is redundant, because these chloro-substituted para-aramids dissolve well in DMAc. However, this is not the case when unsubstituted, or para-aramids having more than 50 mole % of their aromatic moieties unsubstituted, are used. It is known that these para-aramids are insoluble in most solvents. In Example 8 of this reference, an unsubstituted para-aramid was dissolved in DMAc by adding large amounts of HMPA. HMPA, however, is highly carcinogenic and its use in industrial production of para-aramid polymers is prohibited.

WO 94/24211 discloses a solvent system wherein the toxic RMPA was replaced by substantial amounts of PVP. Although solutions with PVP are good spinnable, their disadvantage is that the polymer is obtained as a mixture of PPTA and PVP, thus the products (fibers, films, etc.) also are composed of mixed polymers. For many applications such mixed polymers are unwanted.

In EP 572,002, pulp was prepared by producing para-aramid polymer in NMP/$CaCl_2$, spinning the fiber, and cutting and refining it into pulp. Although spinning takes place directly from PPTA in a mixture of NMP and calcium chloride, this process has the disadvantage that fibers still have to be spun before cutting and refining. Furthermore, the molecular weight of the polymer solution and of the pulp obtained by such a process is limited, i.e., the polymer has a low relative viscosity, due to the high dynamic viscosity of this solution.

SUMMARY

The first objective of the present invention is therefore to provide a para-aramid solution as a spinning dope, preferably exhibiting optical anisotropy, and free from extra components such as pyridine, pyrimidine, N-methylpyrrolidine, or PVP, in order to obtain a spinning dope that can directly be spun without applying high pressure and/or high spinning temperature. Achieving this objective makes it possible to produce an aramid pulp-like fiber of pre-determined length. Further, para-aramid film and paper can be produced from the spinning dope.

When concentrated sulfuric acid is used, the steps for producing a fiber or a pulp-like fiber are quite complicated, and the apparatuses are therefore quite expensive because corrosion by concentrated sulfuric acid must be avoided. Further, solvent systems that are toxic, such as systems comprising HMPA, are industrially impracticable.

Further, according to a process mentioned in U.S. Pat. No. 5,202,184, an aromatic diamine monomer and an aromatic dicarboxylic acid halide monomer are subjected to a polycondensation reaction at an equimolar ratio. An extrudate is formed from the polymer solution dope that exhibits optical anisotropy in a stage prior to completion of the polymerization. In such a process, the polymer solution dope is nothing more than an intermediate taken out halfway through the polymerization. Thus, the polymer solution dope is in an unstable state and can be converted to a high molecular weight substance or can form a gel. This makes it difficult to obtain a product of uniform quality and to continue the process. Thus, at the present stage, the process is not industrially successful. Furthermore, no spinnable high-molecular weight solution is obtained.

The second objective of the present invention is to overcome the above-mentioned disadvantages by providing a process for producing a stable polymer solution and a product of uniform quality according to an industrially advantageous and simplified method, and to obtain pulp-like fibers with a high relative viscosity. In order to obtain pulp with high relative viscosity in one step, a polymer solution with low dynamic viscosity is required to easily form fibrils.

These and other objectives have been achieved by a process for making a non-fibrous polymer solution, wherein an alkali or alkaline earth metal chloride is used as a replacement for HMPA. Surprisingly, it was found that the use of low amounts of these chlorides, i.e. 0.5 to 4.5 wt. % during the polymerization reaction, corresponding to at least 0.7 mole chloride per mole amide group of the polymer and to a maximum of 7.5 wt. % of chloride in the final spinning solution (preferably from 0.9 mole to 7.0 wt. %), leads to complete dissolution of unsubstituted and partially unsubstituted para-aramid in this solvent system. This is remarkable, because higher concentrations of chloride lower the solubility of the para-aramid. At least partially neutralizing the solution is necessary as non-neutralized solutions have increased dynamic viscosity, making these solutions unsuitable for spinning purpose for obtaining fibers and pulp having high relative viscosity. It was now found that the high dynamic viscosity of such solutions could substantially be lowered when in addition to these chlorides, the hydrochloric acid formed during the polymerization is for at least 50 wt. %, preferably for at least 75 wt. %, neutralized. Most preferably, the hydrochloric acid is completely neutralized. It was found that the dynamic viscosity could be lowered by a factor of at least 3, more preferably by at least 5, most preferably by at least 10.

DETAILED DESCRIPTION

To this end the invention pertains to a method comprising the steps of i) making a solution of aromatic diamine and aromatic dicarboxylic acid halide monomers in a mixture of a polar amide solvent selected from N-methyl-2-pyrrolidone, N,N'-dimethylformamide, N,N'-dimethylacetamide, tetramethylurea, and mixtures thereof, with 0.5 to 4.5 wt. % of an alkali or alkaline earth metal chloride during polymerization, corresponding to at least 0.7 mole of an alkali or alkaline earth metal chloride per mole amide groups of the para-aramid and to a maximum of 7.5 wt. % of the alkali or alkaline earth metal chloride in the final polymer solution, ii) polymerizing the monomers under the formation of hydrochloric acid, and iii) neutralizing at least 50 wt. % of the formed hydrochloric acid with an inorganic base during or after the polymerization of the monomers to para-aramid to obtain the final polymer solution.

According to another embodiment of the invention, a non-fibrous polymer solution of para-aramid in a mixture of NMP/CaCl$_2$, NMP/LiCl, or DMAc/LiCl is made, wherein the polymer solution has a relative viscosity $\eta_{rel} > 2.2$.

Another aspect the invention relates to a non-fibrous polymer solution essentially consisting of 1 to 8 wt. % para-aramid, at least 50 mole % of the aromatic moieties thereof being unsubstituted, in a mixture of a) a polar amide solvent selected from N-methyl-2-pyrrolidone, N,N'-dimethylformamide, N,N'-dimethylacetamide, tetramethylurea, and mixtures thereof; b) between 0.7 mole of an alkali or alkaline earth metal chloride per mole amide groups of the para-aramid and 7.5 wt. % of the alkali or alkaline earth metal chloride, and c) water; and wherein at least 50 wt. % of the formed hydrochloric acid is neutralized to obtain a solution having a dynamic viscosity which is at least a factor of three smaller than the dynamic viscosity of the polymer solution without neutralization.

The para-aramid polymer solution of the present invention exhibits a low dynamic viscosity at a temperature up to about 60° C. in a shear rate range of 100-10,000 s$^{-1}$. For that reason the polymer solution according to the invention can be spun at a temperature below 60° C. Further, the para-aramid dope of the present invention is free from extra components such as pyridine, pyrimidine, N-methylpyrrolidine, or PVP. In addition, the para-aramid dope can be produced advantageously from the industrial point of view in that the production process can be simplified and the process is free from the problem of corrosion of apparatuses by concentrated sulfuric acid as compared with the prior dopes using concentrated sulfuric acid as a solvent.

Further, according to the process of the present invention, the polymer solution can be directly spun, and the product can be made into pulp-like fibers without first making the yarn. Thus, the process of production can be greatly simplified as compared with the prior production processes of para-aramid pulp-like fibers.

A para-aramid paper having a long breaking length can be produced from the para-aramid pulp-like fibers of the present invention. When used as a starting material of friction materials including automobile brake and the like, the retention of filler is good. The pulp-like fibers are directly made from spinning the spin solution. Thus, the pulp-like fibers are made without first making yarns.

The invention therefore also relates to para-aramid pulp-like fibers having preferably an ion content <250 ppm for fast migrating ions such as Na$^+$ and Cl$^-$ and a structural irregularity expressed as a difference in CSF (Canadian Standard Freeness) of never dried pulp and dried pulp of at least 100, preferably of at least 150. This means that the fibrous backbone of the pulp is highly kinky, which is not the case with the pulps that are known in the prior art. Preferably the para-aramid pulp-like fibers have a relative viscosity ($\eta_{rel}$) larger than 3.7. In this respect the term "kinky" means that the fiber backbone extends randomly in any direction.

In another embodiment, the invention also pertains to para-aramid film obtainable from the polymer solution of the invention.

The present invention will now be explained in more detail below.

As used in the present invention, the term "para-aramid" means a substance obtained by a polycondensation of a para-oriented aromatic diamine monomer and a para-oriented aromatic dicarboxylic acid halide monomer of which recurring units have amide bonds located substantially in the para-oriented or nearly para-oriented opposite positions of aromatic ring, namely in such coaxially or in-parallel arranged positions as those of para phenylene, 4,4'-biphenylene, 1,5-naphthalene and 2,6-naphthalene.

Concrete examples of said para-aramid include the aramids of which structures have a poly-para-oriented form or a form close thereto, such as poly(paraphenylene terephthalamide), poly(4,4'-benzanilide terephthalamide), poly(paraphenylene-4,4'-biphenylenedicarboxylic acid amide) and poly-(paraphenylene-2,6-naphthalenedicarboxylic acid amide). Among these para-aramids, poly(paraphenylene terephthalamide) is most representative.

As used in the present invention, the term "pulp-like fibers" means small fibers with a length less than 50 mm that are strongly fibrillated. According to this invention, paper is a form of pulp-like fibers that can be directly obtained or be made from pulp-like fibers, optionally in combination with other types of fiber. The term "film" means a layer of non-fibrous material.

This stable spin dope has a para-aramid concentration of 1-8 wt. % and a moderate to high degree of polymerization to allow high relative viscosity ($\eta_{rel}$>2.2). Depending on the polymer concentration the dope exhibits an anisotropic (polymer concentration>1.5%) or an isotropic behavior. Preferably, the dynamic viscosity $\eta_{dyn}$ is smaller than 10 Pa·s, more preferably smaller than 5 Pa·s at a shear rate of 1000 s$^{-1}$.

At least partial neutralization takes place during or preferably after polymerizing the monomers forming the para-aramid. The neutralization agent is not present in the solution of monomers before polymerization has commenced. Neutralization reduces dynamic viscosity by a factor of at least 3, preferably by a factor of at least 5, more preferably of at least 10. The neutralized polymer solution can be used for direct pulp spinning using a nozzle, contacting the polymer stream by pressurized air in a zone with lower pressure where the polymer stream is broken into droplets by expansion of the air. The droplets are attenuated into (pulp-like) fibers.

Coagulation of the fibers or pulp-like fibers takes place using a suitable coagulant such as water or water/NMP/CaCl$_2$. Instead of CaCl$_2$ other chlorides such as LiCl may also be used. By adjusting the polymer flow/air flow ratio, the length and the fibrillation degree of the pulp can be changed. At high ratios long, less fibrillated pulp is obtained, while at low ratios a short, highly fibrillated pulp is obtained.

The pulp-like fibers of the present invention are useful as a starting material for para-aramid paper, friction materials including automobile brakes, various gaskets, E-papers (for instance for electronic purposes, as it contains very low amounts of ions compared to para-aramid pulp made from sulfuric acid solutions), and the like. The water jet can be omitted and the pulp/fibers are then laid down in the form of a sheet or non-woven, after which coagulation takes place.

Examples of the para-oriented aromatic diamine usable in the present invention include para-phenylenediamine, 4,4'-diaminobiphenyl, 2,6-naphthalenediamine, 1,5-naphthalenediamine, and 4,4'-diaminobenzanilide. A maximum of 50 mole % of substituted aromatic diamines may be used, such as 2-methyl-para-phenylenediamine and 2-chloro-para-phenylenediamine.

Examples of para-oriented aromatic dicarboxylic acid halide usable in the present invention include terephthaloyl dichloride, 4,4'-benzoyl dichloride, 2,6-naphthalenedicarboxylic acid dichloride, and 1,5-naphthalenedicarboxylic acid dichloride. A maximum of 50 mole % of substituted aromatic dicarboxylic acid halide may be used, such as 2-chloroterephthaloyl dichloride, 2,5-dichloroterephthaloyl dichloride, 2-methylterephthaloyl dichloride.

The total of substituted aromatic diamine and aromatic dicarboxylic acid halide monomers should be less than 50%. Preferably, at least 70% of the aromatic moieties of the polymer are unsubstituted.

In the present invention 0.950-1.050 mole, preferably 0.980-1.030, more preferably 0.995-1.010 mole of para-oriented aromatic diamine is used per 1 mole of para-oriented aromatic carboxylic acid halide in a polar amide solvent in which 0.5-4.5 wt. % of alkali metal chloride or alkaline earth metal chloride is dissolved, making the concentration of para-aramid obtained thereof 1-8 wt. %, preferably 1-6 wt. %, more preferably 3-5.5 wt. %. In the present invention the polymerization temperature of para-aramid is −20° C. to 70° C., preferably 0° C. to 30° C., and more preferably 5° C. to 25° C. In this temperature range, the dynamic viscosity is within the required range and the pulp-like fiber produced thereof by spinning can have sufficient degree of crystallization and degree of crystal orientation.

Examples of the chlorides of alkali metal or alkaline earth metal usable in the present invention include lithium chloride and calcium chloride. Specific examples of the polar amide solvent usable in the present invention include N-methyl-2-pyrrolidone, N,N'-dimethylformamide, N,N'-dimethylacetamide, and tetramethylurea.

The mixture according to this invention also contains minor amounts of water, at least due to the neutralization reaction. Usually, the water content is less than 5 wt. %, preferably less than 1 wt. %.

An essential feature of the present invention is that the polymerization reaction may be first enhanced and thereafter stopped by at least partially neutralizing the polymer solution or the solution forming the polymer by adding an inorganic base, preferably calcium oxide or lithium oxide. In this respect the terms "calcium oxide" and "lithium oxide" comprise calcium hydroxide and lithium hydroxide, respectively. This neutralization effects the removal of hydrogen chloride, which is formed during the polymerization reaction. Neutralization results in a drop of the dynamic viscosity with a factor of at least 3 (with regard to a non-neutralized corresponding solution). After neutralization, the chlorides are present in an amount of at least 0.7 moles, more preferably in an amount of at least 0.9 moles, per mole of the amide group formed in the polycondensation reaction. The total amount of chloride may originate from CaCl$_2$, which is used in the solvent and from CaO or Ca(OH)$_2$, which is used as a neutralizing agent (base) up to a maximum of 7.5 wt. %, preferably 7.0 wt. %. If the calcium chloride content is too high or too low, the dynamic viscosity of the solution is raised too much to be suitable as a spin solution.

The liquid para-aramid polymerization solution can be supplied with the aid of a pressure vessel to a spinning pump to feed a nozzle for jet spinning of 100-1000 μm to pulp-like fibers. The liquid para-aramid solution is spun through a spinning nozzle into a zone of lower pressure. For air jet spinning more than 1 bar, preferably 4-6 bar is separately applied through a ring-shaped channel to the same zone where expansion of air occurs. Under the influence of the expanding air flow the liquid spinning solution is divided into small droplets and at the same time or subsequently oriented by drawing. Then the pulp-like fibers are coagulated in the same zone by applying a coagulant jet and the formed pulp is collected on a filter, or directly processed to paper. Alternatively, the fibers are laid down on a plate to directly form paper and thereafter coagulated. The coagulant is selected from water, mixtures of water, NMP, and CaCl$_2$, and any other suitable coagulant.

The present invention will now be explained by way of the following non-limitative examples.

The methods of test and evaluation and criteria of judgment employed in the examples and comparative examples were as follows.

TEST METHODS

Relative Viscosity

The sample was dissolved in sulfuric acid (96%) at room temperature at a concentration of 0.25% (m/v). The flow time of the sample solution in sulfuric acid was measured at 25° C. in an Ubbelohde viscometer. Under identical conditions the flow time of the solvent is measured as well. The viscosity ratio is then calculated as the ratio between the two observed flow times.

Dynamic Viscosity

The dynamic viscosity is measured using capillary rheometry at room temperature. By making use of the Powerlaw coefficient and the Rabinowitsch correction, the real wall shear rate and the viscosity have been calculated.

Fiber Length Measurement

Fiber length measurement was done using a Kajaani FS200. As length the 'Weight weighted length' (WL) was used as a measure for the pulp length.

Specific Surface Area (SSA) Determination

Specific surface area ($m^2/g$) was determined using adsorption of nitrogen by the BET specific surface area method, using a Gemini 2375 manufactured by Micromeretics. The wet pulp samples were dried at 120° C. overnight, followed by flushing with nitrogen for at least 1 hour at 200° C.

Evaluation of Optical Anisotropy (Liquid Crystal State)

Optical anisotropy is examined under a polarization microscope (bright image) and/or seen as opalescence during stirring.

Redispersability Test 3 g (dry weight) of never dried pulp is dispersed in 1 l of water during 1000 beats in a Lorentz and Wettre desintegrator. A well-opened pulp is obtained. The Canadian Standard Freeness (CSF) value is measured and corrected for slight differences in weight of the pulp (Tappi 227).

3 g (dry weight) of never dried pulp is dispersed in 1 l water during 1000 beats in a Lorentz and Wettre desintegrator. A handsheet is made from this pulp, which is dried in a sheet dryer (Labtech) during 1 hour at 120° C. After drying the handsheets are torn by hand into small pieces (~3×3 cm) and put into 1 l of water. The pulp is redispersed in an L&W mixer during 1000 beats and the CSF value is measured and corrected for slight differences in weight of the pulp.

Example 1

Polymerization of para-phenyleneterephthalamide was carried out using a 160 l Drais reactor. After sufficiently drying the reactor, 64 l of NMP/$CaCl_2$ (N-methylpyrrolidone/calcium chloride) with a $CaCl_2$ concentration of 2.5 wt. % were added to the reactor. Subsequently, 1487 g of para-phenylenediamine (PPD) were added and dissolved at room temperature. Thereafter the PPD solution was cooled to 10° C. and 2772 g of terephthaloyl dichloride (TDC) were added. After addition of the TDC, the polymerization reaction was continued for 45 min. Then, the polymer solution was neutralized with a calcium oxide/NMP-slurry (776 g of CaO in NMP). After addition of the CaO-slurry, the polymer solution was stirred for at least another 15 min. This neutralization was carried out to remove the hydrochloric acid (HCl), which is formed during polymerization. A gel-like polymer solution was obtained with a PPTA content of 4.5 wt. % and having a relative viscosity of 3.8 (in 0.25% $H_2SO_4$). The obtained solution exhibited optical anisotropy and was stable for more than one month.

Examples 2, 3, and 4

These examples were carried out as in Example 1 with the molar ratios of PPD and TDC as given in Table 1. These examples show that by adjusting the monomer ratio, the degree of polymerization is changed. Reaction time was as stated in Table 1.

The solution of Example 2 was supplied (11 kg/h) with the aid of a pressure vessel to a spinning pump to feed the spinning nozzle of 350 μm. The spinning temperature was ambient. The PPTA was spun through the nozzle into a zone of lower pressure. An air jet of 7 bar was separately applied through a ring-shaped channel to the same zone where expansion of the air occurred. Thereafter, the pulp was coagulated in the same zone by means of applying a coagulant jet (1110 kg/h) and the formed pulp was collected on a filter. Water was used as the coagulant. The resulting pulp (relative viscosity 2.4) had a length of 1.2 mm, an SSA of 6.9 $m^2/g$ and a CSF of 175.

Example 5

This Example was carried out as Example 1 with a molar ratio of PPD and TDC of 1.000. In order to obtain a solution with a relative viscosity of 2.4 a small amount (30 ml) of $H_2O$ was added to the NMP solution.

Example 6

The polymer solution of Example 1 was diluted with NMP to a polymer concentration of 3.6 wt. %. The resulting solution was gel-like and showed optical anisotropy. This polymerization solution was supplied (8 kg/h) with the aid of a pressure vessel to a spinning pump to feed the spinning nozzle of 350 μm. The spinning temperature was ambient. The PPTA was spun through the nozzle into a zone of lower pressure. An air jet of 7 bar was separately applied through a ring-shaped channel to the same zone where expansion of the air occurred. Thereafter, the pulp was coagulated in the same zone by means of applying a coagulant jet (1500 kg/h) and the formed pulp was collected on a filter. Water was used as the coagulant. The resulting pulp (relative viscosity 3.8) had a length of 1.2 mm, an SSA of 1.9 $m^2/g$ and a CSF of 480. After preparing a paper sheet of this material and drying, the sheet was torn in pieces and the CSF was strongly increased to 666.

Example 7

This time the solution of Example 1 was diluted with NMP to a polymer concentration of 1 wt. %. The 1 wt. %-polymer solution is now clearly isotropic of character.

Example 8

Polymerization of para-phenyleneterephthalamide was carried out using a 160 l Drais reactor. After sufficiently drying the reactor, 64 l of NMP/$CaCl_2$ with a $CaCl_2$ concentration of 3.3 wt. % were added to the reactor. Subsequently, 2050 g of PPD were added and dissolved at room temperature. Thereafter, the PPD solution was cooled to 10° C. and 3792 g of TDC were added. After addition of the TDC, the polymerization reaction was continued for 45 min. Then, the polymer solution was neutralized with a calcium oxide/NMP-slurry (1047 g of CaO in NMP). After addition of the CaO-slurry, the polymer solution was stirred for 30 min. This neutralization was carried out to remove the HCl, which is formed during polymerization. A gel-like polymer solution was obtained with a PPTA content of 5.9 wt. % and having a relative viscosity of 2.6 (in 0.25% $H_2SO_4$).

Example 9

Polymerization was carried out as in Example 1. The dynamic viscosity of the polymer solution was found to be 2 Pa·s at 1000 $s^{-1}$.

Example A (Comparative)

This example shows what happens when no neutralization is carried out. Polymerization was carried out as in Example 9 with the exception that no CaO-slurry was added. The polymerization resulted in a crumbled reaction product with a dynamic viscosity 30 Pa·s at 1000 s$^{-1}$.

Example B (Comparative)

This example illustrates what happens when no neutralization is carried out. Polymerization was carried out as in Example 8 with the exception that no CaO-slurry was added. The polymerization resulted in a crumbled reaction product.

Example C (Comparative)

The CSF of a wet highly-fibrillated prior art standard TWARON® pulp characterized by a SSA of 13.5 m$^2$/g and a WL of 1.4 equaled 130. After preparing a paper sheet of this material and drying, the sheet was torn in pieces and the CSF only slightly increased to 165.

TABLE 1

| | Example 1 | Example 2 | Example 3 | Example 4 | Example 5 | Example 6 | Example 7 | Example 8 | Example 9 | Example A | Example B |
|---|---|---|---|---|---|---|---|---|---|---|---|
| CaCl$_2$/amide (mole/mole) at end | 1.08 | 1.06 | 1.19 | 1.07 | 1.07 | 1.09 | 1.05 | 1.01 | 1.09 | 1.04 | 1.06 |
| PPD/TDC (mole/mole) | 1.007 | 1.010 | 1.004 | 0.994 | 1.000 | 1.007 | 1.007 | 1.015 | 1.007 | 1.007 | 1.016 |
| Polymerization time (min) | 45 | 55 | 37 | 47 | 5 | 45 | 45 | 45 | 45 | 45 | 45 |
| $\eta_{rel}$ | 3.8 | 2.4 | 4.3 | 5.8 | 2.4 | 3.8 | 3.8 | 2.6 | 3.4 | 2.6 | 2.4 |
| Polymer conc. (wt. %) | 4.5 | 4.5 | 4.8 | 4.4 | 4.4 | 4.5 | 4.5 | 5.9 | 4.4 | 4.6 | 5.9 |
| Neutralization | yes | yes | yes | Yes | yes | yes | yes | yes | yes | no | no |
| Diluted with NMP | — | — | — | — | — | 3.6 wt. % | 1 wt. % | — | — | — | — |

What is claimed is:

1. A non-fibrous polymer solution, the polymer solution comprising:
    1 to 6 wt. % poly(paraphenylene terephthalamide) (PPTA), obtained from polymerizing para-phenylenediamine and terephthaloyl dichloride under a formation of hydrochloric acid,
    a polar amide solvent selected from the group consisting of N-methyl-2-pyrrolidone (NMP), N,N'-dimethylformamide, N,N'-dimethylacetamide (DMAc), tetramethylurea, and mixtures thereof;
    an alkali or an alkaline earth metal chloride selected from the group consisting of lithium chloride (LiCl) and calcium chloride (CaCl$_2$), in an amount of from 0.7 mole per mole of amide groups of the PPTA to 7.5 wt. % of the polymer solution; and
    water;
    wherein:
        at least 50 wt. % of the formed hydrochloric acid is neutralized,
        the polymer solution is anisotropic,
        the polymer solution has a relative viscosity ($\eta_{rel}$)>2.2 and a dynamic viscosity which is at least a factor of three smaller than a dynamic viscosity of the polymer solution without neutralization, and
        the polymer solution does not comprise hexamethylphosphoramide (HMPA).

2. The non-fibrous polymer solution of claim 1, wherein the polymer solution includes the PPTA in either a mixture of N-methyl-2-pyrrolidone (NMP) and calcium chloride (CaCl$_2$), or a mixture of N,N-dimethylacetamide (DMAc) and lithium chloride (LiCl).

3. The non-fibrous polymer solution of claim 1, wherein the polymer solution has a dynamic viscosity $\eta_{dyn}$<10 Pa·s at a shear rate of 1000 s$^{-1}$.

4. The non-fibrous polymer solution of claim 1, wherein the PPTA is in an amount of 1.5 to 6 wt. %.

5. A process for making the non-fibrous polymer solution of claim 1 comprising:
    making a solution comprising:
        paraphenylene diamine and terephthaloyl dichloride monomers, and
        a polar amide solvent selected from the group consisting of N-methyl-2-pyrrolidone (NMP), N,N'-dimethylformamide, N,N'-dimethylacetamide(DMAc), tetramethylurea, and mixtures thereof,
    polymerizing the monomers in the solution to form a 1 to 6 wt. % poly(paraphenylene terephthalamide) (PPTA) in the polar amide solvent under a formation of hydrochloric acid,
    adding 0.5 to 4.5 wt. % of an alkali or an alkaline earth metal chloride selected from the group consisting of lithium chloride (LiCl) and calcium chloride (CaCl$_2$) during polymerization, in an amount corresponding to from at least 0.7 mole per mole of amide groups of the PPTA to 7.5 wt. % of a polymer solution, and
    neutralizing at least 50 wt. % of the formed hydrochloric acid with an inorganic or a strong organic base during or after the polymerization of the monomers, to obtain a polymer solution,
    wherein the polymer solution does not comprise HMPA, and
    wherein the polymer solution has a relative viscosity ($\eta_{rel}$)>2.2.

6. The process according to claim 5, wherein the formed hydrochloric acid is neutralized with calcium oxide, calcium hydroxide, lithium oxide or lithium hydroxide.

7. A process for forming a pulp, comprising spinning the polymer solution according to claim 1 at a temperature below 60° C.

8. The process according to claim 5, wherein the polymer solution is comprised of 1.5 to 6 wt. % PPTA.

* * * * *

UNITED STATES PATENT AND TRADEMARK OFFICE
CERTIFICATE OF CORRECTION

PATENT NO. : 8,415,417 B2
APPLICATION NO. : 12/790236
DATED : April 9, 2013
INVENTOR(S) : Anton Johannes Josef Hendriks et al.

It is certified that error appears in the above-identified patent and that said Letters Patent is hereby corrected as shown below:

In the Specifications:

In Column 2, Line 22, "RMPA" should be --HMPA--.

In the Claims:

In Column 10, Line 21, "N,N'-dimethylacetamide(DMAc)" should be --N,N'-dimethylacetamide (DMAc)--.

Signed and Sealed this
Fourth Day of June, 2013

Teresa Stanek Rea
*Acting Director of the United States Patent and Trademark Office*